US012761105B2

(12) United States Patent
Mebus

(10) Patent No.: US 12,761,105 B2
(45) Date of Patent: Oct. 13, 2026

(54) LEAK TEST USING A BLOCKING DEVICE

(71) Applicant: INFICON GmbH, Cologne (DE)

(72) Inventor: Stefan Mebus, Cologne (DE)

(73) Assignee: INFICON GmbH, Cologne (DE)

( * ) Notice: Subject to any disclaimer, the term of this patent is extended or adjusted under 35 U.S.C. 154(b) by 316 days.

(21) Appl. No.: 18/711,954

(22) PCT Filed: Oct. 31, 2022

(86) PCT No.: PCT/EP2022/080385
§ 371 (c)(1),
(2) Date: May 21, 2024

(87) PCT Pub. No.: WO2023/094117
PCT Pub. Date: Jun. 1, 2023

(65) Prior Publication Data

US 2025/0020535 A1 Jan. 16, 2025

(30) Foreign Application Priority Data

Nov. 29, 2021 (DE) ..................... 10 2021 131 283.3

(51) Int. Cl.
*G01M 3/22* (2006.01)
*G01M 3/32* (2006.01)

(52) U.S. Cl.
CPC .......... *G01M 3/229* (2013.01); *G01M 3/3281* (2013.01)

(58) Field of Classification Search
CPC ............................ G01M 3/229; G01M 3/3281
USPC .................................. 73/45.1–45.4, 49.6, 52
See application file for complete search history.

(56) References Cited

U.S. PATENT DOCUMENTS

2003/0076011 A1* 4/2003 Brownfiel, Jr. ...... G01N 1/2202 312/1
2010/0326173 A1 12/2010 Abrahamsen
2016/0116365 A1 4/2016 Luedolph et al.
2024/0110841 A1* 4/2024 Hirsch .................. G01M 3/229

FOREIGN PATENT DOCUMENTS

DE 10 2006 017 958 A1 10/2007
DE 2020-19005500 U1 10/2020
EP 0 744 605 A2 11/1996
EP 0 931 253 B1 10/2004
JP 2011-191203 A 9/2011
JP 2012-42227 A 3/2013
JP 2018-520363 A 7/2018
JP 2021-66438 A 4/2021

OTHER PUBLICATIONS

International Search Report dated Mar. 6, 2023 from corresponding International Patent Application No. PCT/EP2022/080385, 5 pages.
Written Opinion dated Mar. 6, 2023 from corresponding International Patent Application No. PCT/EP2022/080385, 7 pages.
German Search Report dated Jun. 30, 2022 from corresponding German Patent Application No. 10 2021 131 283.3, 8 pages.

* cited by examiner

*Primary Examiner* — John Fitzgerald
(74) *Attorney, Agent, or Firm* — Ruggiero McAllister & McMahon LLC

(57) ABSTRACT

A method for leak testing a test specimen includes the following steps: placing the test specimen in a test chamber, testing a leak-tightness of the test specimen in the test chamber, opening the test chamber and removing the test specimen if the leak test has determined that the test specimen is leak-tight, and blocking the test chamber from opening to prevent a removal of the test specimen if the leak test has determined a leak in the test specimen. A leak testing device includes a test chamber receiving the test specimen, a leak detector connected to the test chamber, and a blocking device.

14 Claims, 1 Drawing Sheet

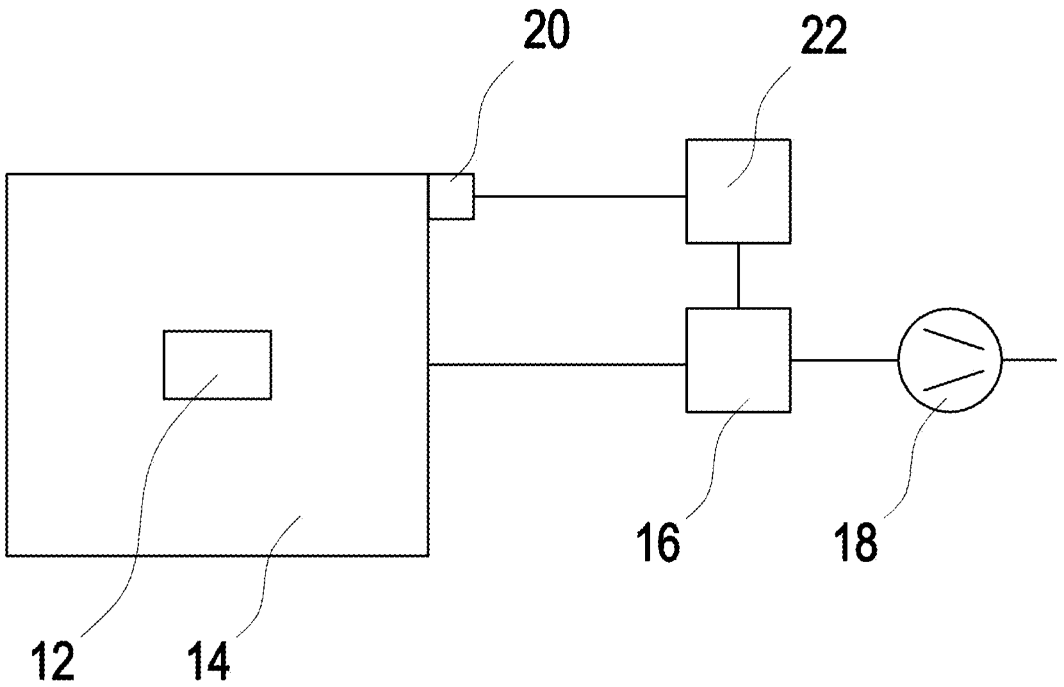
20
22
16
18
12
14

LEAK TEST USING A BLOCKING DEVICE

CROSS-REFERENCE TO RELATED APPLICATIONS

The present application is national stage application filed under 35 U.S.C. § 371 of PCT Application No. PCT/EP2022/080385, filed on Oct. 31, 2022, which claims priority to German patent application 102021131283, filed on Nov. 29, 2021, the entire contents of all of which are incorporated by reference herein.

BACKGROUND OF THE DISCLOSURE

1. Field of the Disclosure

The disclosure relates to leak testing on a test specimen.

2. Description of Related Art

For testing the leak-tightness of test specimens, such as food packaging, it is common and known to place the test specimen to be tested in a test chamber and evacuate the test chamber to a pressure that is lower than the pressure inside the test specimen. Atmospheric pressure typically prevails inside the test specimen. The test chamber is evacuated with the aid of a vacuum pump.

After evacuating the test chamber, gas escaping from the test specimen into the test chamber can be detected by means of a gas detector or gas analyzer, wherein the measurement of a predetermined amount of test gas indicates that the test specimen has a leak from which the test gas escapes from the interior of the test specimen into the test chamber and reaches the gas detector. Alternatively or additionally, the pressure inside the test chamber can be monitored, wherein an increase in the pressure inside the test chamber above a predetermined value or a predetermined rate indicates that the test specimen has a leak from which gas escapes from the inside of the test specimen into the test chamber and increases the pressure there.

Typically, a plurality of test specimens are tested for leaks one after the other, wherein an operator places the test specimens in the test chamber, closes the test chamber, starts and monitors the leak test, and then removes the test specimens after the leak test has been completed. There is a risk that a test specimen detected as leaking will be assigned to the group of test specimens previously detected as leak-tight and not separated therefrom.

SUMMARY OF THE DISCLOSURE

An object of the present disclosure is to enable an improved leak test.

A method according to the disclosure and a testing device according to the disclosure are provided.

According to the disclosure, the test chamber is blocked depending on the result of the leak test in order to prevent the test specimen from being removed from the test chamber if the result of the leak test indicates a leak in the test specimen, while the test chamber is released if the test specimen is leak-tight. This prevents the operator removing the test specimens from the test chamber from treating a test specimen recognized as leaking as a leak-tight test specimen, removing it from the test chamber and accidentally assigning it to the group of test specimens previously tested as leak-tight. Because the test chamber is blocked in the event of a leaking test specimen, the operator must first carry out further activities to remove the test specimen from the test chamber. The procedure is, therefore, different in the case of a leaking test specimen than in the case of a leak-tight test specimen, and the risk of confusion by the operator is reduced.

The test chamber containing the test specimen can be evacuated to a vacuum pressure that is lower than the pressure inside the test specimen before the leak test. For this purpose, the test chamber can be connected to a vacuum pump. In the event of a leak in the test specimen, gas escapes from the inside of the test specimen through the leak into the vacuum chamber.

Alternatively, the test specimen can be pressurized with overpressure and at least a portion of a specific test gas. This test specimen is placed in a test chamber in the form of an accumulation chamber in which the test gas concentration is measured. The test gas concentration in the accumulation chamber, which increases over time, is a measure of the leak rate at the test specimen.

The test chamber can be blocked automatically depending on the result of the leak test. The result of the leak test is the result of a measurement with a leak detector, which can be a gas detector, a gas analyzer and/or a gas measuring device.

To release the blocking of the opening of the test chamber or the blocking of the test chamber, a key is preferably required, which is to be used by a human operator to release the test chamber. The key can be an electronic key, for example in the form of a password or token, or a mechanical key.

The test chamber can be blocked with the aid of a blocking device which is actuated by a control device, wherein the control device receives information about the leak test from a leak detector. A leak detector is a measuring device that performs the leak test, such as a gas detector, a gas analyzer, for example a mass spectrometer or an infrared absorption analyzer, or a gas measuring device.

Alternatively or additionally, the test chamber can be blocked by applying or holding a vacuum inside the test chamber. In this exemplary embodiment, the blocking device can be understood as the control electronics that cause the vacuum to be applied or maintained, for example by activating a vacuum pump or maintaining its operation.

The test chamber can be blocked by applying a mechanical force. The force can be a force that counteracts the force applied to open the test chamber. The force can be applied by a vacuum inside the test chamber or by a mechanical closing element, such as a lock or latch.

The measuring signal of the leak detector can be transmitted as an electronic signal to a control device which is electronically connected to the blocking device, wherein the control device transmits a control signal to the blocking device if a test specimen is detected as leaking, which triggers actuation of the blocking device in order to block the test chamber.

In the present case, a test specimen in which no leak was detected is described as leak-tight, while a test specimen in which a leak was detected is described as leaking. For this purpose, the measuring signal of the leak testing device is typically compared with reference values and/or a threshold value in order to be able to automatically assess whether the test specimen is to be classified in the group of leak-tight test specimens or in the group of leaking test specimens on the basis of the measuring signal. A human operator carrying out the leak test will typically assign a test specimen that has been tested as leak-tight to a group of leak-tight test specimens by moving the test specimen removed from the test chamber, for example, into a container provided for this purpose, onto a conveyor belt provided for this purpose or to another spatially delimited area. The disclosure is intended to reduce the risk of the human operator accidentally assigning a test specimen recognized as leaking to the group of leak-tight test specimens. Blocking the test chamber causes a process for the operator that differs from that of the leak-tight test specimens. By blocking the test chamber when the test specimen is removed, the operator has an additional opportunity to recognize that the test specimen has been tested as leaking and must not be assigned to the group of leak-tight test specimens.

BRIEF DESCRIPTION OF THE DRAWING

The FIGURE shows a block diagram of the leak testing device according to the disclosure.

DETAILED DESCRIPTION OF THE DISCLOSURE

With reference to the FIGURE, an exemplary embodiment of the disclosure is explained in more detail. The FIGURE shows a block diagram of the leak testing device according to the disclosure.

A test specimen 12 to be tested for leaks is placed inside a test chamber 14. The test chamber 14 is a conventional vacuum chamber and is shown in the closed state in the FIGURE. A vacuum pump 18 is vacuum-connected to test chamber 14 in order to evacuate it to a pressure that is lower than the pressure inside test specimen 12. In the event of a leak in test specimen 12, test gas will escape from the inside of test specimen 12 into the inside of test chamber 14 in the area outside test specimen 12.

A leak detector 16 is also vacuum-connected to the inside of test chamber 14 in a gas-conducting manner for leak measurement. In the illustrated exemplary embodiment, leak detector 16 is included in the gas line path connecting test chamber 14 to vacuum pump 18. Other configurations are conceivable. The leak detector 16 can be a conventional gas detector, a gas analyzer or a pressure measuring device to monitor the pressure inside test chamber 14. Valves required for the leak test are available, but are not shown in the FIGURE for reasons of simplicity.

As soon as leak detector 16 measures test gas that has escaped from the interior of test specimen 12 or, in the case of a pressure measuring device, measures a pressure increase that indicates a leak in test specimen 12, leak detector 16 sends an electronic signal to a control device 22 electronically connected to leak detector 16. The control device 22 is configured to automatically generate a control signal that activates a blocking device 20 to prevent test chamber 14 from opening in the event of a measuring signal from leak detector 16 that indicates a leaking test specimen 12. For this purpose, control device 22 is electrically connected to blocking device 20. The blocking device 20 can be a mechanical lock or a lock that locks test chamber 14. Alternatively or additionally, blocking device 20 can also be a valve that connects the interior of test chamber 14 with the atmosphere surrounding test chamber 14 and which is opened before test chamber 14 is opened in order to ventilate test chamber 14. To block test chamber 14, the valve remains closed so that ventilation of test chamber 14 is prevented. The vacuum pressure inside the test chamber is then so high that a human operator cannot open test chamber 14. The closing force for closing the test chamber is then generated by the vacuum pressure. Alternatively or additionally, the closing force can be applied as a mechanical force by a closing device.

It is also conceivable that control device 22 activates vacuum pump 18 or an additional vacuum pump or keeps it in operation in order to maintain or even increase the vacuum pressure inside test chamber 14. In this case, blocking device 20 could be understood as part of the vacuum pump or as an additional vacuum pump.

If an operator now wants to remove test specimen 12 from test chamber 14 after the leak test has shown that test specimen 12 has a leak, the operator must use a key to deactivate blocking device 20. The key can be a mechanical key, for example, to unlock a mechanical closing device or to give control device 22 the command to deactivate blocking device 20. The key can also be an electronic key in the form of a password, which the user must enter into an operation terminal of control device 22. In any case, the operator who wants to remove test specimen 12 from test chamber 14 must take an additional action to remove a leaking test specimen from test chamber 14 than in the case of a leak-tight test specimen. This reduces the risk of confusing a leaking test specimen with the group or amount of test specimens previously tested as leak-tight.

The invention claimed is:

1. A method for leak testing a test specimen, the method comprising the following steps:
- placing the test specimen in a test chamber;
- testing a leak-tightness of the test specimen in the test chamber;
- opening the test chamber and removing the test specimen if the leak test has determined that the test specimen is leak-tight; and
- blocking the test chamber from opening to prevent a removal of the test specimen if the leak test has determined a leak in the test specimen.

2. The method according to claim 1, wherein to release the blocking, an electronic or mechanical key is required.

3. The method according to claim 1, wherein the test chamber is blocked with a blocking device actuated by a control device, and wherein the control device receives information about the leak test from a measuring device carrying out the leak test.

4. The method according to claim 1, wherein the test chamber is blocked by applying or holding a vacuum inside the test chamber.

5. The method according claim 1, wherein the test chamber containing the test specimen is evacuated to a test chamber internal pressure that is lower than a pressure inside the test specimen for testing the leak-tightness of the test specimen, in order to detect gas entering the test chamber from a leak in the test specimen.

6. The method according to claim 1, wherein the test specimen for testing the leak-tightness of the test specimen has a pressure inside that is increased to a pressure that is higher than the pressure inside the test chamber in order to detect gas entering the test chamber from a leak in the test specimen according to the accumulation principle.

7. The method according to claim 1, wherein the step of testing the leak-tightness of the test specimen is carried out with a measuring device in the form of a pressure measuring device or a gas detector or a gas analyzer, and a measuring signal of the measuring device is transmitted to a blocking device actuating a control device.

8. The method according to claim 1, wherein the test chamber is automatically blocked depending on a result of the leak test.

9. The method according to claim 8, wherein to release the blocking, an electronic or mechanical key is required.

10. The method according to claim 1, wherein the test chamber is blocked by applying a mechanical force.

11. The method according to claim 10, wherein the mechanical force is applied by a blocking device.

12. The method according to claim 11, wherein the blocking device is a mechanical closing device.

13. A leak testing device for testing a leak-tightness of a test specimen, comprising:

a test chamber receiving the test specimen;

a leak detector connected to the test chamber; and a blocking device configured to block the test chamber in order to prevent a removal of the test specimen if a measuring signal of the leak detector corresponds to a leaking test specimen and to enable the test chamber to be opened if the measuring signal corresponds to a non-leaking test specimen.

14. The leak testing device according to claim 13, further comprising a vacuum pump connected to the test chamber for to evacuating the test chamber.

* * * * *